(12) United States Patent
Hargrove et al.

(10) Patent No.: US 11,983,949 B2
(45) Date of Patent: May 14, 2024

(54) BIOMETRICS ROBUSTNESS SYSTEMS AND METHODS FOR DETECTING BIOMETRIC SIGNALS OF A USER AND ADAPTIVELY ADJUSTING SIGNAL OUTPUT TO CONTROL ONE OR MORE BIOMETRIC DEVICES

(71) Applicant: COAPT LLC, Chicago, IL (US)

(72) Inventors: Levi John Hargrove, Chicago, IL (US); Blair Andrew Lock, Chicago, IL (US)

(73) Assignee: COAPT LLC, Chicago, IL (US)

( * ) Notice: Subject to any disclaimer, the term of this patent is extended or adjusted under 35 U.S.C. 154(b) by 741 days.

(21) Appl. No.: 17/247,675

(22) Filed: Dec. 18, 2020

(65) Prior Publication Data
US 2022/0198206 A1 Jun. 23, 2022

(51) Int. Cl.
*G06V 40/10* (2022.01)
*G06F 3/01* (2006.01)
*G06N 20/00* (2019.01)
*G06V 40/14* (2022.01)

(52) U.S. Cl.
CPC .............. *G06V 40/10* (2022.01); *G06F 3/015* (2013.01); *G06N 20/00* (2019.01); *G06V 40/14* (2022.01); *G06V 40/15* (2022.01)

(58) Field of Classification Search
CPC .. A61F 2/54; A61F 2/583; A61F 2/586; A61F 2/68; A61F 2/72; A61F 2002/587; A61F 2002/7615; A61F 2002/764; A61F 2/585; A61F 2/80; A61F 2002/543; A61F 2002/6827; A61F 2002/704; G06F 3/015; G06N 20/00; G06V 40/10; G06V 40/15; G06V 40/14; G05B 13/027
See application file for complete search history.

(56) References Cited

U.S. PATENT DOCUMENTS

| | | | | |
|---|---|---|---|---|
| 11,341,826 B1* | 5/2022 | Wiley | ................... | B25J 13/025 |
| 2014/0031952 A1* | 1/2014 | Harshbarger | ........ | A61B 5/7264 623/25 |
| 2023/0022882 A1* | 1/2023 | Byrne | ..................... | A61F 2/583 |

\* cited by examiner

*Primary Examiner* — Nelson M Rosario
(74) *Attorney, Agent, or Firm* — MARSHALL, GERSTEIN & BORUN LLP

(57) ABSTRACT

Biometric robustness systems and methods are described for detecting biometric signals of a user and adaptively adjusting signal output to control biometric devices(s). In various aspects, the biometrics robustness systems and methods comprise determining a biometric signal pattern of the user based on analysis of biometric signals of the user. The biometric signals of the user are detected by one or more biometric sensors. The biometrics robustness systems and methods may comprise generating, by a processor communicatively coupled to the one or more biometric sensors, an adjusted control output based on an anomaly as detected within the biometric signal pattern. The biometrics robustness systems and methods may comprise providing, by the processor, an adjusted control output to a biometric device to control operation of the biometric device.

21 Claims, 5 Drawing Sheets

BIOMETRICS ROBUSTNESS SYSTEMS AND METHODS FOR DETECTING BIOMETRIC SIGNALS OF A USER AND ADAPTIVELY ADJUSTING SIGNAL OUTPUT TO CONTROL ONE OR MORE BIOMETRIC DEVICES

FIELD OF THE DISCLOSURE

The present disclosure generally relates to biometrics robustness systems and methods, and, more particularly, to biometrics robustness systems and methods for detecting biometric signals of a user and for adaptively adjusting signal output to control one or more biometric devices.

BACKGROUND

Biometrics conventionally involves receipt of biometric signals of a user. A problem arises, however, given that such signals typically include "noise," such as errors, interruptions, or other signals that do not reflect the actual biometric state of the user. Existing biometric technologies and standards for noise removal typically require an engineer or signal processing expert to troubleshoot the cause of a biometric device in order to determine and/or diagnose the cause of noise or other faulty signals. Such determination and/or diagnosis routinely requires that raw signal data be reviewed to fully understand the impact of faulty signal data on a given biometric device.

While traditional electronic devices, such as high and low-pass filters, can be used to filter out signal noise, such filtering typically creates data lapses or gaps. Such data lapse or gaps provide can result in poor or otherwise degraded biometric device performance and/or operation.

For the foregoing reasons, there is a need for biometrics robustness systems and methods for detecting biometric signals of a user and for adaptively adjusting signal output to control one or more biometric devices.

BRIEF SUMMARY

Existing techniques for identifying and removing data noise, such as the use of data filters, are typically one-dimensional and ineffective. Accordingly, the inventions of the present disclosure arise from a need for a biometric device that is capable of autonomously identifying and correcting biometric signal noise, such as signal disruption, interruption, disturbance, or other such anomalies or external factors that impact the quality of biometric signals. The biometrics robustness systems and methods solve this need, where biometric signal noise is detected by one or more biometric sensors configured to detect biometric signals of a user. The biometrics robustness systems and methods comprises a biometric software component configured to execute computing instructions that comprise one or more adaptable algorithms or code, each configured to compensate for one or more data anomalies determined from the user's specific biometric data. Such data compensation comprises pattern recognition to determine outcomes (or lack thereof) from the patient's biometric signals. For many products (e.g., biometric devices), this level of autonomous augmentation allows for better control, identification, noise removal, biometric waveform characteristic analysis, and general performance enhancement, without the need for a user intervention.

For example, in various embodiments, the present disclosure describes robust biometrics systems and methods for rapidly detecting biometric signals from a user, classifying such signals based on the presence of signal disruptions or otherwise anomalies, and then adapting the execution of computing instructions ("algorithms") to compensate for the signal disruption and anomalies. For example, in various embodiments as described herein, the biometric robustness systems and methods compensate for disruptions in signal integrity and autonomously adapt or select algorithms to improve output control for the control of biometric devices.

Generally, the present disclosure describes various improvements for biometric devices, including improving aspects of detection of biometric signals, signal integrity, data analysis, and autonomous algorithm adaption, each of which may be specific to a user's biometric signal data. More specifically, the present disclosure relates to intelligent biometric devices, and, more particularly, to intelligent biometric devices at risk of experiencing reduced signal quality due to data signal "noise" caused by external forces or other anomalies, such as motion artifacts, poor sensor-to-user biometric contact, bio excretions (e.g., sweat) of a user, etc. The biometric devices described herein are configured to analyze signal data to determine whether there is an anomaly (e.g., biometric signal disruption) affecting the quality of biometric data as used to control a biometrics device. In various embodiments, the biometrics robustness systems and methods may be embedded in, part of, or otherwise associated with biometric devices. The disclosed biometrics robustness systems and methods may autonomously execute corrective algorithm(s) to compensate for and/or correct signal or data anomalies, automatically on behalf of the user. With the capability to identify, and subsequently autonomously compensate for disruptions in biometric signals, a user will be able to seamlessly use a biometric device without the need for recalibration, troubleshooting, or consulting an expert. The enhancements to the device provides user benefits, including: reducing or eliminating time required to manually compensate for disruptions in signal data, improving the general functionality of the associated biometric device, and allowing technologically advanced devices to be operated by users that may not necessarily have the skills to troubleshoot a malfunctioning device, without the need to consult an expert.

In various embodiments, artificial intelligence (AI), such as machine learning, may be used to analyze biometric sensor data in order to correct user specific baselines and/or profiles which may be used to train machine learning models and/or correct anomalies(s) detected in new biometric signal data, through the incorporation and/or implementation of such machine learning models.

More specifically, in various embodiments herein, a biometrics robustness system is disclosed. The biometrics robustness system is configured to detect biometric signals of a user and to adaptively adjust signal output to control one or more biometric devices. The biometrics robustness system may comprise one or more biometric sensors configured to detect biometric signals of the user. The biometrics robustness system may further comprise a processor communicatively coupled to the one or more biometric sensors and configured to receive the biometric signals. The biometrics robustness system may further comprise a biometric software component comprising computing instructions executable by the processor. Execution of the computing instructions by the processor may cause the processor to determine a biometric signal pattern of the user based on analysis of the biometric signals of the user. Execution of the computing instructions by the processor may further cause the processor to generate an adjusted control output based on an anomaly as detected within the biometric signal pattern. The processor may be configured to provide the adjusted control output to a biometric device to control operation of the biometric device.

In addition, in various embodiments herein, a biometrics robustness method is disclosed for detecting biometric signals of a user and adaptively adjusting signal output to control one or more biometric devices. The biometrics robustness method may comprise determining a biometric signal pattern of the user based on analysis of biometric signals of the user. The biometric signals of the user may be detected by one or more biometric sensors. The biometrics robustness method may further comprise generating, by a processor communicatively coupled to the one or more biometric sensors, an adjusted control output based on an anomaly as detected within the biometric signal pattern. The biometrics robustness method may further comprise providing, by the processor, an adjusted control output to a biometric device to control operation of the biometric device.

In still further embodiments herein, a tangible, non-transitory computer-readable medium is disclosed. The tangible, non-transitory computer-readable medium may store instructions for detecting biometric signals of a user and adaptively adjusting signal output to control one or more biometric devices. The instructions, when executed by one or more processors, may cause the one or more processors to determine a biometric signal pattern of the user based on analysis of biometric signals of the user. The biometric signals of the user may be detected by one or more biometric sensors. The instructions, when executed by one or more processors, may further cause the one or more processors to generate an adjusted control output based on an anomaly as detected within the biometric signal pattern. In addition, the instructions, when executed by one or more processors, may cause the one or more processors to provide an adjusted control output to a biometric device to control operation of the biometric device.

The biometrics robustness systems and methods described herein may be used with, or applied to, a variety of devices. For example, in some embodiments the biometrics robustness systems and methods may be used with, or applied to, prosthesis control, and, more generally, for devices/products that utilize neural interfaces, implantable electrodes, sensors, and/or other sensor-like hardware. For example, the biometrics robustness systems and methods may be applied to medical devices or medical-grade prosthetics or devices, e.g., comprising neural interfaces and/or implantable electrodes. In addition, the biometrics robustness systems and methods be used with, or otherwise applied to wearable devices (e.g., "wearables" such as smart watches, or other such consumer devices, etc.). Still further, such biometrics robustness systems and methods may be used with, or otherwise applied to, existing (e.g., third-party devices) and/or company-specific, proprietary devices (e.g., an APPLE WATCH, etc.).

The inventive embodiments of the present disclosure provide numerous advantages over conventional biometric data analysis techniques. Generally, the disclosed biometrics robustness systems and methods provide autonomous analysis and adaptive control of biometric signals specific to a given user. Because intermittent sensor-to-user contact can be an issue (e.g., when one or more sensors lose contact with a user, the resulting biometric signals as received by a processor may demonstrate intermittent biometric signals or lapse of data for a specific time period and/or location on a user), a biometric software component comprising computing instructions executes on one or more processors to monitor signals for sensor "liftoff" interference (or other anomaly) in real-time. The biometric software component is configured with various computing instructions or otherwise ancillary algorithms to robustly change the decoding model or analysis to emulate valid sensor channels. That is, in various embodiments, the biometric software component is configured to detect sensor lift and adapts/provides consistent biometric signal data by modulating (e.g., amplifying, reducing, or otherwise predicting) the signal to emulate the otherwise anticipated biometric signals that would have been expected to have been read by the biometric sensors as if the sensor "liftoff" were not present. The biometric software component may also adjust for additional technical issues, including, for example, sensor malfunction. This provides performance robustness with sensor changes for wearable decoders, implantable electrodes, or other such biometric related sensors.

As described for various embodiments, the biometrics robustness systems and methods autonomously analyze biometric data to identify the presence and cause for anomalies (e.g., signal disruptions) and execute, implement, or otherwise apply analysis algorithms to compensate for such anomalies. For example, in various embodiments, such anomalies may be caused by electrode liftoff or intermittent contact, where the biometrics robustness systems and methods compensate for the lack of information or contact with the user. The biometrics robustness systems and methods increase the robustness and performance of given biometric device's usability by compensating for intermittent or adverse data collection.

In accordance with the above, and with the disclosure herein, the present disclosure includes improvements in computer functionality or in improvements to other technologies at least because the disclosure describes that, e.g., a biometric device is improved via the disclosed biometrics robustness systems and methods, where the biometrics robustness systems and methods are able to adaptively generate, based on the specific biometric signal data of user, an adjusted control output that enhances the performance of such biometric devices. That is, the present disclosure describes improvements in the functioning of the computer itself or "any other technology or technical field" because the increased functionality of device performance has the capability of substantial impact on biometric device(s) that rely on the interpretation of biometric data. This improves over the prior art at least because prior art devices lack the adaptability of the biometrics robustness systems and methods, including, for example, the adaptability of the biometrics robustness systems and methods in selecting various control algorithms to control for various anomalies specific to the signal of a given user.

The present disclosure relates to improvement to other technologies or technical fields at least because the biometrics robustness systems and methods provide for faster and more precise techniques of electronically compensating for disturbances in signal data to improve device and analytical functionality. In various embodiments, this is accomplished by using an artificial intelligence or machine learning component that can determine the cause, and solution, for noisy data. Such artificial intelligence or machine learning component autonomously compensates or adapts for a disturbance it caused in signal data or a related dataset. For example, every tissue in the body is electrically active; creating small levels of electricity when used or even when idle. Not unlike a fingerprint, these levels of electricity are completely unique to each user. These patterns of signals can take many different forms, such as electromyographic, electrocardiographic, infrared, ultrasonic, optical, accelerometric, and gyroscopic signals and/or data. These biometric signals also differ if a user performs a specific motion. For example, making a fist or doing a "thumbs-up" motion, would create different biometric signals, albeit still unique to the user. Once an artificial intelligence or machine learning component has been trained with a user's specific biometric data, the artificial intelligence or machine learning component can analyzes the user's biosignature, learning their personal biometric fingerprint and creation of biometric signals. Thus, when a portion of the biometric signal data becomes disrupted, for example, from interrupted bioelectric contact on a device electrode, the artificial intelligence or machine learning component can classify, predict, or use related data (e.g., of existing empirical data from adjacent electrodes) to compensate for the missing set of data, improving device functionality.

In addition, the present disclosure includes applying the biometrics robustness systems and methods with, or by use of, a particular machine, e.g., a biometrics device controlled via the biometrics robustness systems and methods as described herein.

Still further, the present disclosure includes effecting a transformation or reduction of a particular article to a different state or thing, e.g., transforming the control state of a biometrics device via the biometrics robustness systems and methods as described herein.

The present disclosure includes specific features other than what is well-understood, routine, conventional activity in the field, and/or otherwise adds unconventional steps that confine the disclosure to a particular useful application, e.g., biometrics robustness systems and methods for detecting biometric signals of a user and for adaptively adjusting signal output to control one or more biometric devices.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
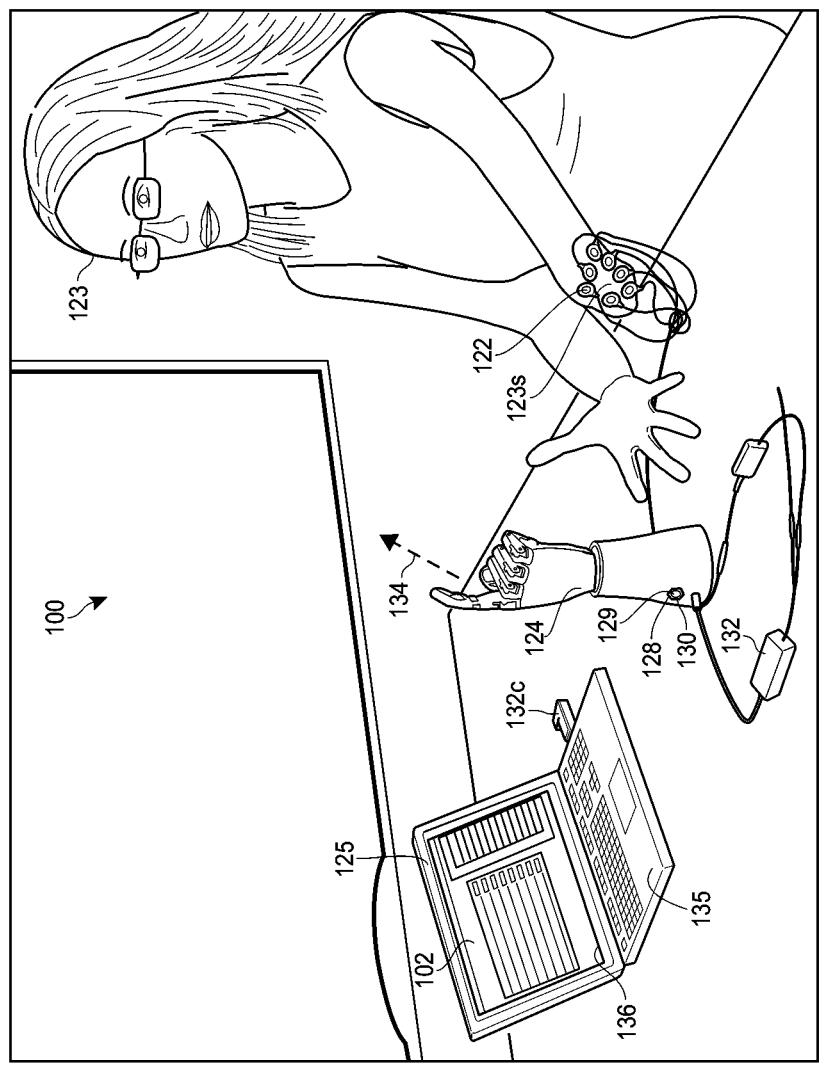
FIG. 1 illustrates an example biometrics robustness system configured to detect biometric signals of a user and adaptively adjust signal output to control one or more biometric devices, in accordance with various embodiments herein.

The Figures depict preferred embodiments for purposes of illustration only. Alternative embodiments of the systems and methods illustrated herein may be employed without departing from the principles of the invention described herein.

DETAILED DESCRIPTION

While the present invention is susceptible of embodiments in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and systems consistent with the present invention are capable of other embodiments and of being practiced and carried out in various ways. Also, it is to be understood that the phraseology and terminology employed herein, as well as the abstract included below, are for the purposes of description and should not be regarded as limiting.

FIG. 1 illustrates an example biometrics robustness system 100 configured to detect biometric signals of a user and adaptively adjust signal output to control one or more biometric devices, in accordance with various embodiments herein. More generally, FIG. 1 illustrates a biometrics robustness system for collecting data specific to a user, analyzing data for interruption, correcting, modulating, cleaning, and/or otherwise alternating an associated data stream to generate processed data, and/or processing signal output based on such processed data.

In the example embodiment of FIG. 1, a user 123 is connected to a biometric device 124 (e.g., a prosthetic wrist and hand) via sensor(s) 122. While FIG. 1 illustrates a prosthetic device (e.g., biometric device 124), it is to be understood that biometrics robustness system 100 may be configured to operate with non-prosthetic devices (e.g., wearables, etc.), or, more generally, other such sensor based devices.

Biometrics robustness system 100 is configured to collect biometric signals of a user 123 to allow for biometric data analysis and device control as described herein. FIG. 1 illustrates biometric contact between the user 123 and one or more sensors 122. Sensor(s) 122 are configured to detect biometric signals of a user. Sensor(s) 122 are depicted as electrode based sensors. However, other sensors or sensor combinations may be used. For example, in various embodiments, sensor(s) may comprise any one or more of, e.g., EMG sensors, sonomyography (SMG) sensors, infrared (IR) sensors, inertial measurement unit (IMU) sensors, etc. The biometric signals of the user correspond to the sensor(s)

used (e.g., sensor(s) 122) and may comprise one or more of: electromyographic (EMG) signals; electroencephalographic (EEG) signals; electrocardiographic (ECG) signals; mechanomyographic (MMG) signals; electrooculographic (EOG) signals; galvanic skin responsive (GSR) signals; magnetoencephalographic (MEG) signals; ultrasonic signals; gyroscopic signals; and/or accelerometric signals. In accordance with the above, the biometrics robustness system 100 may comprise a biometric detection device with a unique configuration of sensors, number of sensors, and sensor locations, in allowance for conformance to the specific anatomy of the user (e.g., user 123). Accordingly, the biometrics robustness system 100 can adapt to each particular configuration for a given user (e.g., user 123), and be configured itself to collect and analyze the biometric data as collected from the user 123.

Biometrics robustness system 100 further comprises a processor communicatively coupled to sensor(s) 122 and configured to receive the biometric signals. In some embodiments, the processor may comprise a myoelectric prosthetic controller configured or calibrated to control biometric device 124. In other embodiments, the processor may be a microprocessor (e.g., embedded in a wearable device) or other such processor configured to receive biometric signals of a user (e.g., user 123). In some embodiments, the processor may be included in, or be part of, or otherwise communicatively connected to, a biometric device (e.g., biometric device 124).

Additionally, or alternatively, the processor may be included in connection module 132. Connection module 132 connects user 123 to biometric device 124, and receives biometric signals of user 123. In additional embodiments, connection module 132 sends and receives data to and from other device(s), such as computer 125. In the example of FIG. 1, connection module 132 is communicatively coupled to hardware component 132c via a wireless communication. Communication hardware component 132c is shown as a USB based wireless transmitter communicating via BLUETOOTH, WIFI, or other radio-based communication standard. In some embodiments, signal data of the user, for example as shown herein for FIG. 4, may be collected from sensor(s) 122 and transmitted to hardware component 132c via connection module 132, for recording, visualization, analysis, training of machine learning components or models, etc. While a laptop computer is shown for computer 125, it is to be understood that a mobile computing device (not shown), such as an APPLE IPHONE or ANDROID DEVICE may also be used. Such mobile device may also be connected via BLUETOOTH to biometric device 124 (e.g., biometric device 124), as illustrated in FIG. 1.

Biometrics robustness system 100 further comprises a biometric software component comprising computing instructions executable by the processor. In various embodiments, the biometrics robustness system 100 comprises a tangible, non-transitory computer-readable medium (e.g., computer memory). The biometric software component may be stored on the tangible, non-transitory computer-readable medium (e.g., computer memory). The tangible, non-transitory computer-readable medium (e.g., computer memory) is configured to store instructions for detecting biometric signals of a user and adaptively adjusting signal output to control one or more biometric devices (e.g., biometric device 124) as described herein. For example, as described herein, execution of the computing instructions by the processor may cause the processor to determine a biometric signal pattern of the user based on analysis of the biometric signals of the user, and generate an adjusted control output (e.g., modulated signal output) based on an anomaly as detected within the biometric signal pattern. The processor is configured to provide the adjusted control output to the biometric device (e.g., biometric device 124) to control operation of the biometric device.

In the example of FIG. 1, biometric device 124 further comprises a button 128 comprising or exposing a tactile interface 130. User 123 can interact with and/or receive feedback from biometrics robustness system 100 via button 128. For example, button 128 may comprise an indicator 129 (e.g., an LED or visual indicator; a speaker; or a haptic indicator, e.g., vibrator), where user 123 can be notified as to the quality of the signal data (e.g., as described for FIG. 4), through an auditory, tactile, or visual stimulus.

Also as shown in the example of FIG. 1, biometrics robustness system 100 further comprises a graphic user interface (GUI) providing a virtual user interface 102. Software component 136 comprises a visual application configured to display a graphic user interface, which may be a computer-based, virtual user interface 102 displayed via a web page (e.g., via Active Server Pages, PHP, or the like) or desktop application. Additionally, or alternatively, software component 136 may comprise a mobile application-based user-interface (a mobile "app") for presentation on a mobile device (not shown), such as an APPLE IPHONE). Such visual interfaces, or GUIs, are referred to herein as "virtual user interfaces" In various embodiments, a virtual user interface is configured to render visual feedback based on any one or more of: (1) the biometric signals of the user, (2) the biometric signal pattern, (3) the adjusted control output, or (4) the anomaly as detected within the biometric signal pattern. For example, such visual feedback is illustrated herein for FIG. 4.

In some embodiments, biometric signals may be recorded in a system memory 135 (e.g., a system memory of, or as communicatively coupled to a computing or electronic device, such as biometric device 124, computer 125, connection module 132, or otherwise of biometrics robustness system 100). User 123 can access the biometric signals for viewing, review, or otherwise, e.g., via virtual user interface 102. For example, a user may review their collected signal data (e.g., as shown for FIG. 4) in relation to a given voluntary or indicated motion 134 (e.g., a "pointing" motion). Other such may voluntary or indicated motions may include, by non-limiting example, any one or more of an elbow motion ("flex" and/or "extend"), wrist motion ("pronate" and/or "supinate"), and/or a hand motion ("open," "close," "tool," "key," and/or "pinch").

In some embodiments, biometrics robustness system 100 may provide one or more indications that one or more disruptions of signal integrity have occurred. Such indications may be provided via either of the button 128 and/or the virtual interface 102. For example, the virtual user interface and/or the button interface may be configured to alert a user of an anomaly, e.g., such as a sensor issue/malfunction, via a haptic and/or visual indication via button 128 or virtual user interface 102.

Figure 2A:
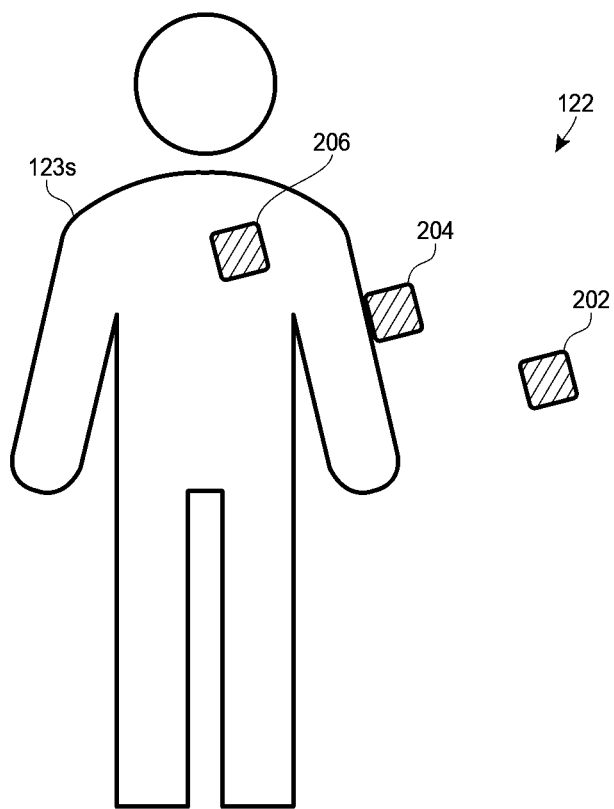
FIG. 2A illustrates where biometric sensor(s) may be positioned in reference to a user, in accordance with various embodiments herein.
Figure 2B:
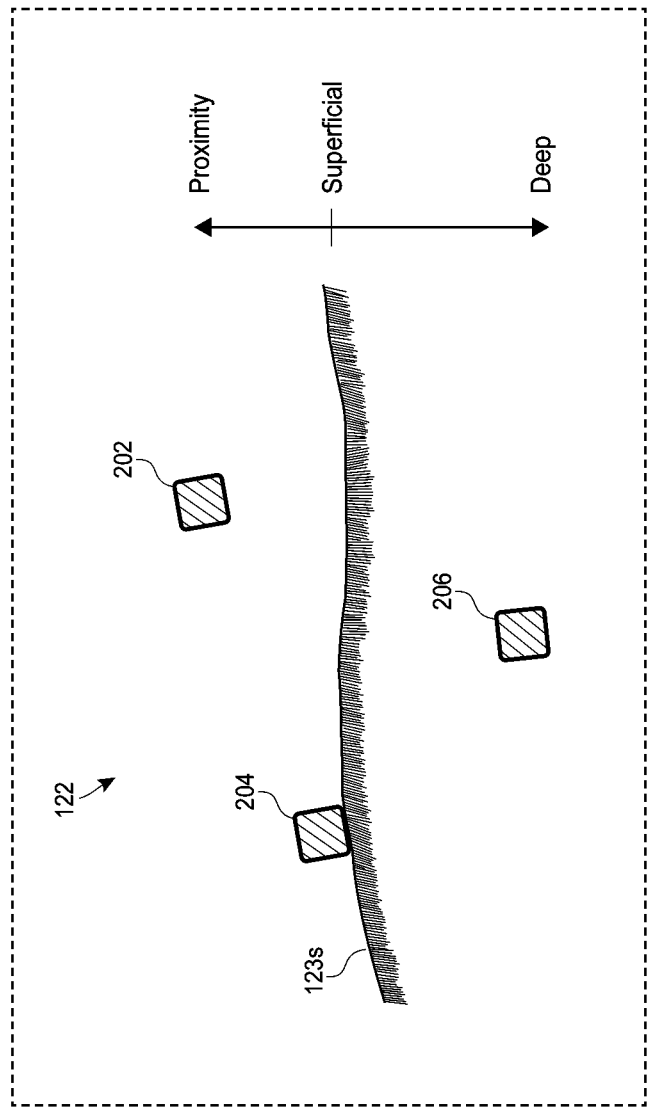
FIG. 2B illustrates where biometric sensor(s) may be positioned in reference to a user's skin, in accordance with various embodiments herein.

FIGS. 2A and 2B illustrate example biometric sensors (e.g., sensor(s) 122) of the biometrics robustness system 100 of FIG. 1, in accordance with various embodiments herein. FIGS. 2A and 2B demonstrate various example locations and/or positions of biometric sensors with respect to a user. More specifically, FIG. 2A illustrates where a biometric sensor(s) 122 may be positioned in reference to a user (e.g., user 123); whereas FIG. 2B illustrates where a biometric sensor(s) 122 may be positioned in reference to a user's (e.g., user 123) skin 123s. For example, the biometric sensors 122 may be positioned or located at any one or more of a subdermal location 206, a dermal location 204, or a proximity location 202 to skin 123s of the user 123 to collect biometric signals. That is, collection of biometric information from a user (e.g., user 123) occurs by sensor(s) 122 being in biometric contact with the user (either in proximity, dermal, or subdermal of the user). A proximity location 202 may comprise a sensor above or near the user's skin 123s or, alternatively, close enough to the user (e.g., user 123) to allow the biometric sensors 122 in a proximity location 202 to collect biometric and/or biosignal data from the user. A dermal location 204 may comprise a sensor in direct contact on or at the user's skin 123s. A subdermal location 206 may comprise a sensor embedded within the user's skin 123s, deep to the user's skin 123s, embedded within a user's (e.g., user 123) muscles, or otherwise deep in comparison to a dermal location 204.

In various embodiments, a biometric sensor (e.g., sensor(s) 122 as shown for FIG. 1) may be situated to cause biometric contact with a user. As described, biometric contact can include but is not limited to being in proximity to a user, in direct contact with the user, or embedded within the user to collect biometric signals. A user may then, through voluntary or involuntary means, generate a biometric signal (e.g., via an indicated motion 134). The biometric signal is collected by or through the biometric sensor sensor(s) 122. Such biometric signal may then be analyzed and/or stored biometric data. Such analyzed biometric data may then be corrected (e.g., to determine if a disruption of signal integrity is present) and/or used to implement biometric device control, for example, as described for FIG. 3 herein.

Figure 3:
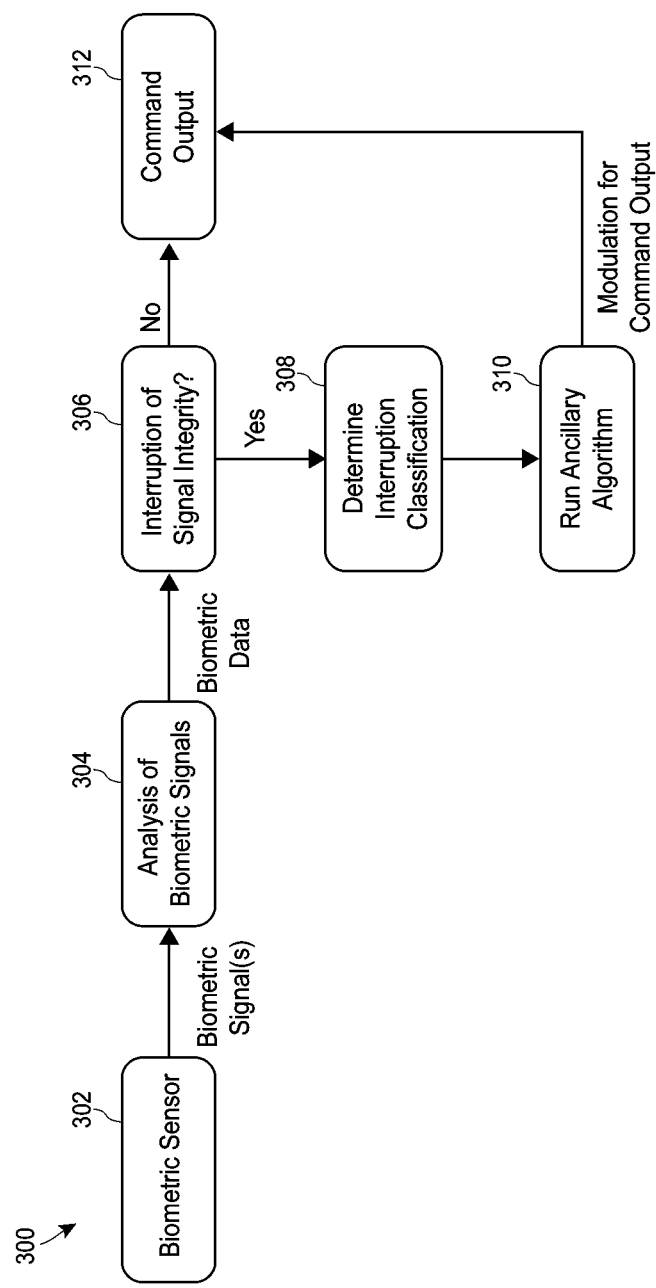
FIG. 3 is a flow diagram of a biometrics robustness method for detecting biometric signals of a user and adaptively adjusting signal output to control one or more biometric devices, in accordance with various embodiments herein.

FIG. 3 is a flow diagram of a biometrics robustness method 300 for detecting biometric signals of a user and adaptively adjusting signal output to control one or more biometric devices, in accordance with various embodiments herein. More generally, biometrics robustness method 300 illustrates operation of the biometric system of FIG. 1. Although the algorithm of biometrics robustness method 300 is illustrated via multiple blocks, it is to be understood that fewer or additional blocks or functions may be implemented for purposes of adaptively adjusting signal output to control one or more biometric device, with respect to biometrics robustness method 300, or as otherwise described herein.

At block 302, biometrics robustness method 300 comprises detecting biometric signals of a user by one or more biometric sensors (e.g., sensor(s) 122). As described for FIG. 1, sensor(s) 122 may comprise any one or more of, e.g., EMG sensors, sonomyography (SMG) sensors, infrared (IR) sensors, inertial measurement unit (IMU,) sensors, etc. In various embodiments, biometric signals of a user may be generated whenever a user activates muscles or tissue. For example, a user may complete one or more of motions, tasks, or baseline actions (e.g., indicated motion 134) which may generate biometric signals specific to the user. As described for FIGS. 2A and 2B, sensor(s) used to collect biometric signal of the user may be in direct contact with the user, in proximity to the user, implanted within the user, or otherwise configured to collect biometric signals of the user. In some embodiments, at least one implantable, proximity, and/or contact sensor may be used to collect one or more biometric signal(s) specific to the user.

Figure 4:
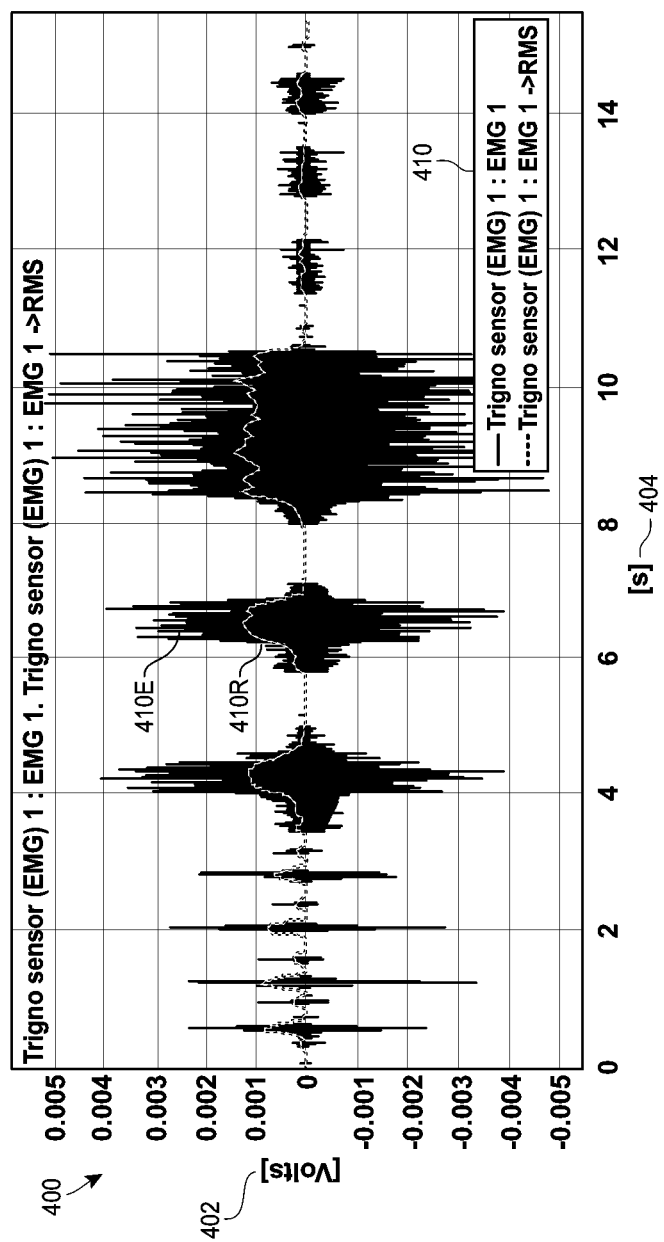
FIG. 4 illustrates a visualization of biometric signals of a user, in accordance with various embodiments herein.

For example, FIG. 4 illustrates a visualization 400 of biometric signals (e.g., 410E and 410R) of a user, in accordance with various embodiments herein. In the example of FIG. 4, visualization 400 illustrates detection of biometric signals (e.g., 410E and 410R) for a given user (e.g., user 123) using TRIGNO branded EMG sensors as provided by DELSYS INCORPORATED. It is to be understood, however, that other sensor types and/or brands may be utilized.

Visualization 400 illustrates various signal data types 410 plotted across volts 402 (y-axis) and time 404 (x-axis, in seconds). EMG data 410E represents raw EMG data as collected from the user and visualized across volts 402 (y-axis) and time 404 (x-axis, in seconds) of visualization 400. Visualization 400 illustrates EMG data 410E (i.e., raw voltage data) spiking or increasing on volts 402 across time 404. Such data may represent motions, movements, contractions, etc. of a user's muscles or tissues. Additionally, or alternatively, such data may represent data interruption or anomalies (e.g., false positives) in the data. Such data may be used by the disclosed biometrics robustness systems and methods herein to detect and compensate for anomalies as described herein.

EMG data 410R represents root-mean-square (RMS) EMG data, which is smoothed or altered data, as collected from the user and visualized across volts 402 (y-axis) and time 404 (x-axis, in seconds) of visualization 400. EMG data 410R represents a smoothed version of EMG data 410E. Visualization 400 illustrates EMG data 410R (i.e., RMS computed data) spiking or increasing on volts 402 across time 404. Such data may represent motions, movements, contractions, etc. of a user's muscles or tissues. Additionally, or alternatively, such data may represent data interruption or anomalies (e.g., false positives) in the data. Such data may be used by the disclosed biometrics robustness systems and methods herein to detect and compensate for anomalies as described herein.

It is to be understood that EMG data 410E and 410R are provided as examples, such that additional and/or signal different may be collected from a user, including data representative or otherwise corresponding to the various sensor(s) described herein.

With reference to block 304, biometrics robustness method 300 comprises determining a biometric signal pattern of the user based on analysis of biometric signals of the user. A biometric signal pattern defines a distinct and/or unique set of biometric signal data that may be specific to a user (e.g., user 123). For example, in some embodiments, biometric signals may be collected during data collection session. Data collected during a data collection session may be used to establish a baseline to determine user action or intention regarding the user's wish to execute a specific command (e.g., prosthetic or indicated motion 134) in reference to a biometric indication. A biometric indication or baseline comprises a predetermined set of biometric signals defining one or more biometric signal pattern(s) of a user.

Additionally, or alternatively, biometrics robustness method 300 comprises creating a biometric profile based on the biometric signal data related to a particular user, or to a particular motion from a particular user (e.g., indicated motion 134). These biometric profiles allow the example biometrics robustness system 100 to store or record empirical information regarding the specific user's baseline biometrics, identifying when the biometric signals demonstrate deviance from the previously recorded baseline. In some embodiments, the biometric profile is stored in the memory, and may be otherwise configured, modulated, controlled, or deleted at the discretion of the user. In these embodiments, the user (e.g., user 123) may determine that one or more components of the biometric profile require at least additional data, less data, and/or need to be recalibrated. Even further, these embodiments provide the user (e.g., user 101)

with the capacity to configure their biometric profile to optimize the biometrics robustness method 300 to optimize the biometrics robustness system's 100 control of biometric enabled devices. Such configuration may include providing the user, e.g., via a virtual user interface or button interface, options or selections modify signal or data collection, processing, or algorithm usage for any one or more signals, data, and/or user motions (that generate such signals and/or data).

More generally, a biometric signal pattern defines distinct biometric signals specific to a user. Biometric signals of a user can be continuously compared to baseline biometric data and/or a biometric signal pattern of a user to determine whether a distribution to signal integrity or other such anomaly has occurred.

In some embodiments, biometrics robustness method 300 comprises determining a biometric signal pattern of a user (e.g., user 123) by at least one of: (1) determining whether the one or more biometric sensors are detecting the biometric signals of the user (e.g., determining whether there is a low, no, and/or strong signal of the user); (2) detecting whether the user is producing voluntary biometric data (e.g., indicated motion 134); or (3) detecting whether the user is producing passive biometric data (e.g., biometric signal data observed while the use is stationary or otherwise not making intentional motions for biometric data signal generation).

At block 306, biometrics robustness method 300 comprises generating, by a processor (e.g., of biometric device 124) communicatively coupled to the one or more biometric sensors (e.g., sensor(s) 122), an adjusted control output based on an anomaly as detected within the biometric signal pattern. Generally, an anomaly in the biometric signal pattern correlates with disrupted or lost signal output of the one or more sensors. In specific non-limiting embodiments, an anomaly may be a disruption of signal integrity caused by at least one of the following: (a) sensor loss of cutaneous or conductive contact, (b) an insufficient sensor reading, (c) a sensor malfunction, (d) a shifted sensor location, (e) user fatigue, (f) periodic motion interference, (g) routine motion interference, (h) a low signal-to-noise ratio, (i) an external influencer, or (j) insufficient reference data.

Detection of anomalies in biometric signal patterns or signal data, or otherwise determining when a biometric indicator is present (in the case of multiple anomalies or indicators), as performed at block 306, is critical to enhance control and operation of a biometric device. Specifically, it is important to determine whether the data has any confounding factors that disrupt the integrity of the biometric data. For example, if a user is connected to three electroencephalogram electrodes (sensors), and one of the sensors has an excessive amount of sodium buildup (such as from dried sweat), the biometric data received through that particular sensor (the impacted sensor) may be disrupted in comparison to the other two data streams of the other two sensors. In such embodiments, the impacted sensor may produce degraded, different, or corrupted signal data, which can impact control output, and ultimately, control of a biometric device. Identification and comparison of these data disturbances may be used to run compensatory instructions (e.g. of biometric software component), as described herein, to correct for the disturbance quickly and efficiently. For example, biometric software component may identify, based on the biometric signal data, that there is a sodium buildup between the user and the electrode and then may recreate the biometric signal data from available information as if the sodium were not present. This would allow an associated biometric device (e.g., biometric device 124) to run at an optimum efficiency. In this way, as described herein, biometrics robustness method 300 may be used to improve the quality of analytics and device function, and for various different circumstances, including but not limited to: identifying when a user is fatigued, when a biometric sensor shifts position on a user, when a biometric sensor has intermittent or interrupted contact with a user, or when a biometric device (e.g., biometric device 124) needs to recalibrate.

At block 308, biometrics robustness method 300 comprises determining an interrupt (e.g., anomaly) classification. For example, once biometrics robustness system 100 has determined that one or more disruptions in signal integrity are present (block 306), biometrics robustness system 100 may, in some embodiments, classify each disruption. In some embodiments, biometric software component and/or biometrics robustness system 100 may comprise a machine learning component trained to classify, predict, or otherwise detect the biometric signals of the user as unique to the user, which may be used to classify or otherwise detect interruptions (e.g., anomalies).

The machine learning component, e.g., of the biometric software component and/or otherwise of biometrics robustness system 100, may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in a particular area of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data (such as biometric signal pattern of the user based on analysis of the biometric signals of the user) in order to facilitate classifying or making predictions for subsequent data (to classify or predict whether an anomaly is detected within the biometric signal pattern of the user).

Machine learning model(s), such as those of the biometric software component and/or otherwise of biometrics robustness system 100, may be created and trained based upon example (e.g., "training data,") inputs or data (which may be termed "features" and "labels") in order to make valid and reliable predictions for new inputs, such as testing level or production level data or inputs.

In supervised machine learning, a machine learning program operating on a server, computing device (e.g., computer 125), or otherwise processor(s), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

With reference to FIG. 3, biometrics robustness method 300 may comprise a machine learning component (e.g., a machine learning model) that is trained on data comprising at least one of: (1) user voluntary or involuntary generated biometric signals; (2) a prompted indicator; (3) a stimulus; (4) a sequence of predetermined biometric generated actions; (5) biometric data of one or more other users; (6) simulated biometric data; or (7) or data provided by a third-party. Such data may be the same or similar to data as generated, e.g., with respect to indicated motion(s) 134, as described herein.

The machine learning model may be implemented in example biometrics robustness system 100 to analyze or compare new biometric signals with baseline data or biometric profile data of a user. For example, in some embodiments, biometrics robustness system 100 records the user-specific biometric signals specific to a user. The machine learning model, trained with such data signals, may then analyze new biometric data of the user to compare characteristics against the baseline biometric profile of the user to determine or classifying whether there is a disruption in biometric signal data. The biometrics robustness system 100 may then adapt modulation algorithms or output to more effectively and efficiently control the biometric device 124. In some embodiments, if the user (e.g., user 123) completes an indicated motion 134, the resulting biometric signal data may be added to the user profile to increase the data library for the user-specific indicated motion 134, as empirical data to be used during characteristic comparison and/or machine learning training or model prediction in subsequent motions on behalf of the user. For example, The machine learning model may utilize this empirical data in the subsequent analysis or comparison of biometric signals.

Additionally, or alternatively, biometric signals may be analyzed through fuzzy logic, pattern classification, computational neural networks, forward dynamic modeling, and/or support vector machines. For example, each user creates or generates specific biometric signals that are unique just to the user, having micro characteristics that only the user could recreate. The machine learning component, as generated on the unique data, allows the machine learning component, or model, to be specific to the user. In this way, the machine learning component is able to determine when the specific user's biometric signals (or data) are being disrupted. Once biometrics robustness system 100 has leveraged the user's specific biometric signal data to identify that there is a disruption, the same reference point can be used to determine what kind of signal disruption is occurring. Subsequently, the system can then use ancillary algorithms (as described herein) to modulate the biometric data to better account for the disruption in signal integrity.

Similarly, in various embodiments, a biometric profile may be created for a user based on an initial set of biometric signal data. The biometric signal data that is used to create the user's biometric profile may have additional data removed, added, or otherwise altered to better represent the user's baseline biometric data. A subsequent collection of biometric signals can then be used to reference against the initial set of biometric signal data, providing the system with more information on the user's unique biometric profile. The subsequent collection of biometric signals may be used to add additional data to the initial set of biometric signal data, to modify the initial set of biometric signal data, or otherwise be used as reference to initiate or baseline a hardware process or software program. The subsequent collection of biometric signals may be used to identify if the presence of biometric signal disruption is present, and initiate ancillary algorithms appropriately.

At block 310, biometrics robustness method 300 comprises execution, implementation, or otherwise running of an ancillary algorithm designed to compensate for the one or more disruptions of signal integrity (e.g., an anomaly), for example, as determined by interrupt classification (block 308). Should an anomaly be detected, and/or have the potential to cause a signal integrity disruption, the example biometrics robustness system 100 can implement one or more modulating or ancillary algorithms (i.e., computing instructions) to compensate for the anomaly and/or possible signal integrity disruption.

Such ancillary algorithm(s) may modulate the disrupted biometric data to improve data quality. Generally, modulation of disrupted biometric data involves direct changes to the biometric signal data, including but not limited to: removal of identified noise, shifting of data points, addition of more data points, or deletion of data points to better facilitate analysis algorithm function. Such modulation of the data adjusts control output, and/or allows for generation of adjusted control output, by the processor, to thereby increase operational efficiency of biometric device 124. In various embodiments, modulation of the data comprises the processor executing computing instructions of the biometric software component to implement ancillary algorithm(s). The ancillary algorithm(s) may comprise one or more of: (a) automatically generating the adjusted control output to compensate for sensor loss of cutaneous or conductive contact; (b) automatically generating the adjusted control output to compensate for an insufficient sensor reading; (c) automatically generating the adjusted control output to compensate for a sensor malfunction; (d) automatically generating the adjusted control output to compensate for a shifted sensor locations; (e) automatically generating the adjusted control output to compensate for user fatigue; (f) automatically generating the adjusted control output to compensate for periodic motion interference; (g) automatically generating the adjusted control output to compensate for routine motion interference; (h) automatically generating the adjusted control output to compensate for a low signal-to-noise ratio; (i) automatically generating the adjusted control output to compensate for an external influencer; (j) automatically generating the signal output upon insufficient reference data when more data is required; and/or (k) automatically generating the adjusted control output to compensate for a system recalibration event.

Additionally, or alternatively, an anomaly as detected within the biometric signal pattern may comprise the detection of distributed biometric data caused by a disrupted sensor (e.g., of sensor(s) 122) experiencing disrupted biometric contact with the user. The disrupted sensor may be located at a disruption location in a proximity (e.g., proximate, dermal, or subdermal) to the user's body. In such embodiments, the biometric software component comprises computing instructions executable by the processor, wherein execution of the computing instructions by the processor causes the processor to modify the adjusted control output based on the disruption location in the proximity to the user's body.

At block 312, biometrics robustness method 300 comprises providing, by the processor, an adjusted control or command output to a biometric device (e.g., biometric device 124) to control operation of the biometric device. The adjusted control output is generated to compensate for the detected anomaly, and to improve the operation of the biometric device. In various embodiments, an adjusted control output may comprise at least one of the following: (1) biometric signals of the user as originally detected; (2) biometric signals of the user in an unmodified form; (3) biometric signals of the user in a modified or modulated form; (4) an instruction set containing one or more signal integrity disruptions corresponding to the biometric signals of the user; (5) an instruction set containing one or more modifications corresponding to the biometric signals of the user; and/or (6) a command to the biometric device to implement an operation of the biometric device. In various embodiments, generation or provision of the adjusted control output may comprise at least one of: (1) reducing signal noise of the biometric signals of the user; (2) adding artificial data upon a determining that the biometric signals of the user are insufficient; or (3) providing a start or stop command to the biometric device.

For example, in one embodiment, an adjusted control output may compensate for an anomaly by re-creating biometric data to emulate data as if the disruptions of signal integrity were not present, thereby actively modifying the recorded set of data to allow analysis algorithms to better analyze the associated biometric data.

In another embodiment, an adjusted control output may be generated to compensate for an anomaly by providing a data indicator or prompt to the biometric data, including but not limited to the types and number of disruptions to signal integrity. This indicator or prompt can then be used by the downstream ancillary algorithms (block 310) to process biometric data with precursor information to the presence of a disruption of signal integrity. The purpose of re-creating the biometric data is to allow the ancillary algorithms to analyze the biometric data without having any confounding, unintended, or misleading information within the dataset; optimizing the characteristics of the data spread to better facilitate analysis algorithms and artificial intelligence to identify trends and key biometric indicators. Additionally, or alternatively, re-creation of signal data may include using one or more ancillary algorithms to modulate the biometric data set depending on how many disruptions of signal integrity are detected.

In various embodiments, the adjusted control or command output may be used to control biometric device 124, initiate a third party mechanically automated process, hardware component, or initiate a software program. Such control output may be sent to a controller of the biometric device 124, an application programming interface (API) of the biometric device 124, or other such communication or command interface of the biometric device 124 used to control or change the state of the biometric device 124.

Aspects of the Present Disclosure

The following aspects of the disclosure are exemplary only and not intended to limit the scope of the disclosure.

1. A biometrics robustness system configured to detect biometric signals of a user and to adaptively adjust signal output to control one or more biometric devices, the biometrics robustness system comprising: one or more biometric sensors configured to detect biometric signals of the user; a processor communicatively coupled to the one or more biometric sensors and configured to receive the biometric signals; and a biometric software component comprising computing instructions executable by the processor, wherein execution of the computing instructions by the processor causes the processor to: determine a biometric signal pattern of the user based on analysis of the biometric signals of the user, and generate an adjusted control output based on an anomaly as detected within the biometric signal pattern, wherein the processor is configured to provide the adjusted control output to a biometric device to control operation of the biometric device.

2. The biometrics robustness system of aspect 1, wherein the anomaly is a disruption of signal integrity caused by at least one of the following: (a) sensor loss of cutaneous or conductive contact, (b) an insufficient sensor reading, (c) a sensor malfunction, (d) a shifted sensor location, (e) user fatigue, (f) periodic motion interference, (g) routine motion interference, (h) a low signal-to-noise ratio, (i) an external influencer, or (j) insufficient reference data.

3. The biometrics robustness system as in any one of aspects 1-2, wherein generation of the adjusted control output by the processor comprises the processor executing the computing instructions of the biometric software component to: (a) automatically generate the adjusted control output to compensate for sensor loss of cutaneous or conductive contact, (b) automatically generate the adjusted control output to compensate for an insufficient sensor reading; (c) automatically generate the adjusted control output to compensate for a sensor malfunction; (d) automatically generate the adjusted control output to compensate for a shifted sensor locations; (e) automatically generate the adjusted control output to compensate for user fatigue; (f) automatically generate the adjusted control output to compensate for periodic motion interference; (g) automatically generate the adjusted control output to compensate for routine motion interference; (h) automatically generate the adjusted control output to compensate for a low signal-to-noise ratio; (i) automatically generate the adjusted control output to compensate for an external influencer; (j) automatically generate the signal output upon insufficient reference data when more data is required; or (k) automatically generate the adjusted control output to compensate for a system recalibration event.

4. The biometrics robustness system as in any one of aspects 1-3, wherein determining the biometric signal pattern of the user comprises at least one of: (1) determining whether the one or more biometric sensors are detecting the biometric signals of the user; (2) detecting whether the user is producing voluntary biometric data; or (3) detecting whether the user is producing passive biometric data.

5. The biometrics robustness system as in any one of aspects 1-4, wherein generating the adjusted control output comprises at least one of: (1) reducing signal noise of the biometric signals of the user; (2) adding artificial data upon a determining that the biometric signals of the user are insufficient; or (3) providing a start or stop command to the biometric device.

6. The biometrics robustness system as in any one of aspects 1-5, wherein the adjusted control output may comprise at least one of the following: (1) biometric signals of the user as originally detected; (2) biometric signals of the user in an unmodified form; (3) biometric signals of the user in a modified or modulated form; (4) an instruction set containing one or more signal integrity disruptions corresponding to the biometric signals of the user; (5) an instruction set containing one or more modifications corresponding to the biometric signals of the user; or (6) a command to the biometric device to implement an operation of the biometric device.

7. The biometrics robustness system as in any one of aspects 1-6 comprising a virtual user interface configured to render visual feedback based on any one or more of: (1) the biometric signals of the user, (2) the biometric signal pattern, (3) the adjusted control output, or (4) the anomaly as detected within the biometric signal pattern.

8. The biometrics robustness system as in any one of aspects 1-7, wherein the anomaly as detected within the biometric signal pattern comprises detecting distributed biometric data caused by a disrupted sensor of the one or more biometric sensors experiencing disrupted biometric contact with the user, the disrupted sensor located at a disruption location in a proximity to the user's body, wherein the biometric software component further comprises computing instructions executable by the processor, wherein execution of the computing instructions by the processor causes the processor to: modify the adjusted control output based on the disruption location in the proximity to the user's body.

9. The biometrics robustness system as in any one of aspects 1-8 further comprising a button interface or a virtual interface configured to provide one or more indications that one or more disruptions of signal integrity have occurred.

10. The biometrics robustness system as in any one of aspects 1-9 further comprising a machine learning component trained detect the biometric signals of the user as unique to the user.

11. The biometrics robustness system of aspect 10, wherein the machine learning component is trained on data comprising at least one of: (1) user voluntary generated biometric signals; (2) a prompted indicator; (3) a stimulus; (4) a sequence of predetermined biometric generated actions; (5) biometric data of one or more other users; (6) simulated biometric data; or (7) or data provided by a third-party.

12. The biometrics robustness system as in any one of aspects 1-11, wherein the biometric signals of the user comprise one or more of: electromyographic (EMG) signals; electroencephalographic (EEG) signals; electrocardiographic (ECG) signals; mechanomyographic (MMG) signals; electrooculographic (EOG) signals; galvanic skin responsive (GSR) signals; magnetoencephalographic (MEG) signals; ultrasonic signals; gyroscopic signals; or accelerometric signals.

13. The biometrics robustness system as in any one of aspects 1-12, wherein the one or more biometric sensors are configured to position subdermal, dermal, or in a proximity to skin of the user to collect biometric signals.

14. A biometrics robustness method for detecting biometric signals of a user and adaptively adjusting signal output to control one or more biometric devices, the biometrics robustness method comprising: determining a biometric signal pattern of the user based on analysis of biometric signals of the user, the biometric signals of the user detected by one or more biometric sensors; generating, by a processor communicatively coupled to the one or more biometric sensors, an adjusted control output based on an anomaly as detected within the biometric signal pattern; and providing, by the processor, an adjusted control output to a biometric device to control operation of the biometric device.

15. The biometrics robustness method of aspect 14, wherein the anomaly is a disruption of signal integrity caused by at least one of the following: (a) sensor loss of cutaneous or conductive contact, (b) an insufficient sensor reading, (c) a sensor malfunction, (d) a shifted sensor location, (e) user fatigue, (f) periodic motion interference, (g) routine motion interference, (h) a low signal-to-noise ratio, (i) an external influencer, or (j) insufficient reference data.

16. The biometrics robustness method as in any one of aspects 14-15, wherein generation of the adjusted control output by the processor comprises the processor executing the computing instructions of the biometric software component to: (a) automatically generate the adjusted control output to compensate for sensor loss of cutaneous or conductive contact, (b) automatically generate the adjusted control output to compensate for an insufficient sensor reading; (c) automatically generate the adjusted control output to compensate for a sensor malfunction; (d) automatically generate the adjusted control output to compensate for a shifted sensor locations; (e) automatically generate the adjusted control output to compensate for user fatigue; (f) automatically generate the adjusted control output to compensate for periodic motion interference; (g) automatically generate the adjusted control output to compensate for routine motion interference; (h) automatically generate the adjusted control output to compensate for a low signal-to-noise ratio; (i) automatically generate the adjusted control output to compensate for an external influencer; (j) automatically generate the signal output upon insufficient reference data when more data is required; or (k) automatically generate the adjusted control output to compensate for a system recalibration event.

17. The biometrics robustness method as in any one of aspects 14-16, wherein determining the biometric signal pattern of the user comprises at least one of: (1) determining whether the one or more biometric sensors are detecting the biometric signals of the user; (2) detecting whether the user is producing voluntary biometric data; or (3) detecting whether the user is producing passive biometric data.

18. The biometrics robustness method as in any one of aspects 14-17, wherein generating the adjusted control output comprises at least one of: (1) reducing signal noise of the biometric signals of the user; (2) adding artificial data upon a determining that the biometric signals of the user are insufficient; or (3) providing a start or stop command to the biometric device.

19. The biometrics robustness method as in any one of aspects 14-18, wherein the adjusted control output may comprise at least one of the following: (1) biometric signals of the user as originally detected; (2) biometric signals of the user in an unmodified form; (3) biometric signals of the user in a modified or modulated form; (4) an instruction set containing one or more signal integrity disruptions corresponding to the biometric signals of the user; (5) an instruction set containing one or more modifications corresponding to the biometric signals of the user; or (6) a command to the biometric device to implement an operation of the biometric device.

20. A tangible, non-transitory computer-readable medium storing instructions for detecting biometric signals of a user and adaptively adjusting signal output to control one or more biometric devices, that when executed by one or more processors, cause the one or more processors to: determine a biometric signal pattern of the user based on analysis of biometric signals of the user, the biometric signals of the user detected by one or more biometric sensors; generate an adjusted control output based on an anomaly as detected within the biometric signal pattern; and, provide an adjusted control output to a biometric device to control operation of the biometric device.

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A biometrics robustness system configured to detect biometric signals of a user and to adaptively adjust signal output to control one or more biometric devices, the biometrics robustness system comprising:
   one or more biometric sensors configured to detect biometric signals of the user;
   a processor communicatively coupled to the one or more biometric sensors and configured to receive the biometric signals; and
   a biometric software component comprising computing instructions executable by the processor, wherein execution of the computing instructions by the processor causes the processor to:
      determine a biometric signal pattern of the user based on analysis of the biometric signals of the user, and
      generate an adjusted control output based on an anomaly as detected within the biometric signal pattern,
   wherein the processor is configured to provide the adjusted control output to a biometric device to control operation of the biometric device,
   wherein generation of the adjusted control output by the processor comprises the processor executing the computing instructions of the biometric software component to: (a) automatically generate the adjusted control output to compensate for sensor loss of cutaneous or conductive contact, (b) automatically generate the adjusted control output to compensate for an insufficient sensor reading; (c) automatically generate the adjusted control output to compensate for a sensor malfunction; (d) automatically generate the adjusted control output to compensate for a shifted sensor locations; (e) automatically generate the adjusted control output to compensate for user fatigue; (f) automatically generate the adjusted control output to compensate for periodic motion interference; (g) automatically generate the adjusted control output to compensate for routine motion interference; (h) automatically generate the adjusted control output to compensate for a low signal-to-noise ratio; (i) automatically generate the adjusted control output to compensate for an external influencer; (j) automatically generate the signal output upon insufficient reference data when more data is required; or (k) automatically generate the adjusted control output to compensate for a system recalibration event.

2. The biometrics robustness system of claim 1, wherein the anomaly is a disruption of signal integrity caused by at least one of the following: (a) sensor loss of cutaneous or conductive contact, (b) an insufficient sensor reading, (c) a sensor malfunction, (d) a shifted sensor location, (e) user fatigue, (f) periodic motion interference, (g) routine motion interference, (h) a low signal-to-noise ratio, (i) an external influencer, or (j) insufficient reference data.

3. The biometrics robustness system of claim 1, wherein determining the biometric signal pattern of the user comprises at least one of: (1) determining whether the one or more biometric sensors are detecting the biometric signals of the user; (2) detecting whether the user is producing voluntary biometric data; or (3) detecting whether the user is producing passive biometric data.

4. The biometrics robustness system of claim 1, wherein generating the adjusted control output comprises at least one of: (1) reducing signal noise of the biometric signals of the user; (2) adding artificial data upon a determining that the biometric signals of the user are insufficient; or (3) providing a start or stop command to the biometric device.

5. The biometrics robustness system of claim 1, wherein the adjusted control output may comprise at least one of the following: (1) biometric signals of the user as originally detected; (2) biometric signals of the user in an unmodified form; (3) biometric signals of the user in a modified or modulated form; (4) an instruction set containing one or more signal integrity disruptions corresponding to the biometric signals of the user; (5) an instruction set containing one or more modifications corresponding to the biometric signals of the user; or (6) a command to the biometric device to implement an operation of the biometric device.

6. The biometrics robustness system of claim 1 comprising a virtual user interface configured to render visual feedback based on any one or more of: (1) the biometric signals of the user, (2) the biometric signal pattern, (3) the adjusted control output, or (4) the anomaly as detected within the biometric signal pattern.

7. The biometrics robustness system of claim 1,
   wherein the anomaly as detected within the biometric signal pattern comprises detecting distributed biometric data caused by a disrupted sensor of the one or more biometric sensors experiencing disrupted biometric contact with the user, the disrupted sensor located at a disruption location in a proximity to the user's body,
   wherein the biometric software component further comprises computing instructions executable by the processor, wherein execution of the computing instructions by the processor causes the processor to:
      modify the adjusted control output based on the disruption location in the proximity to the user's body.

8. The biometrics robustness system of claim 1 further comprising a button interface or a virtual interface configured to provide one or more indications that one or more disruptions of signal integrity have occurred.

9. The biometrics robustness system of claim 1 further comprising a machine learning component trained detect the biometric signals of the user as unique to the user.

10. The biometrics robustness system of claim 9, wherein the machine learning component is trained on data comprising at least one of: (1) user voluntary generated biometric signals; (2) a prompted indicator; (3) a stimulus; (4) a sequence of predetermined biometric generated actions; (5) biometric data of one or more other users; (6) simulated biometric data; or (7) or data provided by a third-party.

11. The biometrics robustness system of claim 1, wherein the biometric signals of the user comprise one or more of: electromyographic (EMG) signals; electroencephalographic (EEG) signals; electrocardiographic (ECG) signals; mechanomyographic (MMG) signals; electrooculographic (EOG) signals; galvanic skin responsive (GSR) signals; magnetoencephalographic (MEG) signals; ultrasonic signals; gyroscopic signals; or accelerometric signals.

12. The biometrics robustness system of claim 1, wherein the one or more biometric sensors are configured to position subdermal, dermal, or in a proximity to skin of the user to collect biometric signals.

13. A biometrics robustness method for detecting biometric signals of a user and adaptively adjusting signal output to control one or more biometric devices, the biometrics robustness method comprising:
 determining a biometric signal pattern of the user based on analysis of biometric signals of the user, the biometric signals of the user detected by one or more biometric sensors;
 generating, by a processor communicatively coupled to the one or more biometric sensors, an adjusted control output based on an anomaly as detected within the biometric signal pattern; and
 providing, by the processor, an adjusted control output to a biometric device to control operation of the biometric device,
 wherein generation of the adjusted control output by the processor comprises the processor executing the computing instructions of the biometric software component to: (a) automatically generate the adjusted control output to compensate for sensor loss of cutaneous or conductive contact, (b) automatically generate the adjusted control output to compensate for an insufficient sensor reading; (c) automatically generate the adjusted control output to compensate for a sensor malfunction; (d) automatically generate the adjusted control output to compensate for a shifted sensor locations; (e) automatically generate the adjusted control output to compensate for user fatigue; (f) automatically generate the adjusted control output to compensate for periodic motion interference; (g) automatically generate the adjusted control output to compensate for routine motion interference; (h) automatically generate the adjusted control output to compensate for a low signal-to-noise ratio; (i) automatically generate the adjusted control output to compensate for an external influencer; (j) automatically generate the signal output upon insufficient reference data when more data is required; or (k) automatically generate the adjusted control output to compensate for a system recalibration event.

14. The biometrics robustness method of claim 13, wherein the anomaly is a disruption of signal integrity caused by at least one of the following: (a) sensor loss of cutaneous or conductive contact, (b) an insufficient sensor reading, (c) a sensor malfunction, (d) a shifted sensor location, (e) user fatigue, (f) periodic motion interference, (g) routine motion interference, (h) a low signal-to-noise ratio, (i) an external influencer, or (j) insufficient reference data.

15. The biometrics robustness method of claim 13, wherein determining the biometric signal pattern of the user comprises at least one of: (1) determining whether the one or more biometric sensors are detecting the biometric signals of the user; (2) detecting whether the user is producing voluntary biometric data; or (3) detecting whether the user is producing passive biometric data.

16. The biometrics robustness method of claim 13, wherein generating the adjusted control output comprises at least one of: (1) reducing signal noise of the biometric signals of the user; (2) adding artificial data upon a determining that the biometric signals of the user are insufficient; or (3) providing a start or stop command to the biometric device.

17. The biometrics robustness method of claim 13, wherein the adjusted control output may comprise at least one of the following: (1) biometric signals of the user as originally detected; (2) biometric signals of the user in an unmodified form; (3) biometric signals of the user in a modified or modulated form; (4) an instruction set containing one or more signal integrity disruptions corresponding to the biometric signals of the user; (5) an instruction set containing one or more modifications corresponding to the biometric signals of the user; or (6) a command to the biometric device to implement an operation of the biometric device.

18. A tangible, non-transitory computer-readable medium storing instructions for detecting biometric signals of a user and adaptively adjusting signal output to control one or more biometric devices, that when executed by one or more processors, cause the one or more processors to:
 determine a biometric signal pattern of the user based on analysis of biometric signals of the user, the biometric signals of the user detected by one or more biometric sensors;
 generate an adjusted control output based on an anomaly as detected within the biometric signal pattern; and
 provide an adjusted control output to a biometric device to control operation of the biometric device,
 wherein generation of the adjusted control output by the processor comprises the processor executing the computing instructions of the biometric software component to: (a) automatically generate the adjusted control output to compensate for sensor loss of cutaneous or conductive contact, (b) automatically generate the adjusted control output to compensate for an insufficient sensor reading; (c) automatically generate the adjusted control output to compensate for a sensor malfunction; (d) automatically generate the adjusted control output to compensate for a shifted sensor locations; (e) automatically generate the adjusted control output to compensate for user fatigue; (f) automatically generate the adjusted control output to compensate for periodic motion interference; (g) automatically generate the adjusted control output to compensate for routine motion interference; (h) automatically generate the adjusted control output to compensate for a low signal-to-noise ratio; (i) automatically generate the adjusted control output to compensate for an external influencer; (j) automatically generate the signal output upon insufficient reference data when more data is required; or (k) automatically generate the adjusted control output to compensate for a system recalibration event.

19. A biometrics robustness system configured to detect biometric signals of a user and to adaptively adjust signal output to control one or more biometric devices, the biometrics robustness system comprising:
 one or more biometric sensors configured to detect biometric signals of the user;
 a processor communicatively coupled to the one or more biometric sensors and configured to receive the biometric signals; and
 a biometric software component comprising computing instructions executable by the processor, wherein execution of the computing instructions by the processor causes the processor to:
  determine a biometric signal pattern of the user based on analysis of the biometric signals of the user, and
  generate an adjusted control output based on an anomaly as detected within the biometric signal pattern, wherein the processor is configured to provide the adjusted control output to a biometric device to control operation of the biometric device, wherein the anomaly as detected within the biometric signal pattern comprises detecting distributed biometric data caused by a disrupted sensor of the one or more biometric sensors experiencing disrupted biometric contact with the user, the disrupted sensor located at a disruption location in a proximity to the user's body, wherein the biometric software component further comprises computing instructions executable by the processor, wherein execution of the computing instructions by the processor causes the processor to:

modify the adjusted control output based on the disruption location in the proximity to the user's body.

20. A biometrics robustness method for detecting biometric signals of a user and adaptively adjusting signal output to control one or more biometric devices, the biometrics robustness method comprising:

determining a biometric signal pattern of the user based on analysis of biometric signals of the user, the biometric signals of the user detected by one or more biometric sensors;

generating, by a processor communicatively coupled to the one or more biometric sensors, an adjusted control output based on an anomaly as detected within the biometric signal pattern;

providing, by the processor, an adjusted control output to a biometric device to control operation of the biometric device, wherein the anomaly as detected within the biometric signal pattern comprises detecting distributed biometric data caused by a disrupted sensor of the one or more biometric sensors experiencing disrupted biometric contact with the user, the disrupted sensor located at a disruption location in a proximity to the user's body; and modifying the adjusted control output based on the disruption location in the proximity to the user's body.

21. A tangible, non-transitory computer-readable medium storing instructions for detecting biometric signals of a user and adaptively adjusting signal output to control one or more biometric devices, that when executed by one or more processors, cause the one or more processors to:

determine a biometric signal pattern of the user based on analysis of biometric signals of the user, the biometric signals of the user detected by one or more biometric sensors;

generate an adjusted control output based on an anomaly as detected within the biometric signal pattern;

provide an adjusted control output to a biometric device to control operation of the biometric device, wherein the anomaly as detected within the biometric signal pattern comprises detecting distributed biometric data caused by a disrupted sensor of the one or more biometric sensors experiencing disrupted biometric contact with the user, the disrupted sensor located at a disruption location in a proximity to the user's body; and modify the adjusted control output based on the disruption location in the proximity to the user's body.

* * * * *

UNITED STATES PATENT AND TRADEMARK OFFICE
CERTIFICATE OF CORRECTION

PATENT NO. : 11,983,949 B2
APPLICATION NO. : 17/247675
DATED : May 14, 2024
INVENTOR(S) : Levi John Hargrove et al.

Page 1 of 1

It is certified that error appears in the above-identified patent and that said Letters Patent is hereby corrected as shown below:

On the Title Page

At item (57), Line 3, "devices(s)." should be -- device(s). --.

In the Claims

At Column 22, Line 51, "trained detect" should be -- trained to detect --.

Signed and Sealed this
Twenty-fifth Day of February, 2025

Coke Morgan Stewart
*Acting Director of the United States Patent and Trademark Office*